US009686206B2

(12) United States Patent
Nemeth et al.

(10) Patent No.: US 9,686,206 B2
(45) Date of Patent: Jun. 20, 2017

(54) TEMPORAL BASED COLLABORATIVE MUTUAL EXCLUSION CONTROL OF A SHARED RESOURCE

(71) Applicant: Silicon Graphics International Corp., Milpitas, CA (US)

(72) Inventors: Joseph Carl Nemeth, Fort Collins, CO (US); Kevan Flint Rehm, Brooklynn Park, MN (US)

(73) Assignee: SILICON GRAPHICS INTERNATIONAL CORP., Milpitas, CA (US)

( * ) Notice: Subject to any disclaimer, the term of this patent is extended or adjusted under 35 U.S.C. 154(b) by 455 days.

(21) Appl. No.: 14/265,195

(22) Filed: Apr. 29, 2014

(65) Prior Publication Data

US 2015/0312165 A1    Oct. 29, 2015

(51) Int. Cl.
*G06F 15/167*    (2006.01)
*H04L 12/925*    (2013.01)
*G06F 9/52*    (2006.01)

(52) U.S. Cl.
CPC ............ *H04L 47/722* (2013.01); *G06F 9/526* (2013.01)

(58) Field of Classification Search
CPC ........ G06F 12/0831; G06F 9/52; G06F 9/526; G06F 9/3004
See application file for complete search history.

(56) References Cited

U.S. PATENT DOCUMENTS

| 6,029,190 | A  | * | 2/2000  | Oliver   | G06F 9/526 718/107 |
| 6,226,717 | B1 | * | 5/2001  | Reuter   | G06F 9/524 711/147 |
| 6,546,443 | B1 | * | 4/2003  | Kakivaya | G06F 9/524 710/108 |
| 6,938,084 | B2 | * | 8/2005  | Gamache  | G06F 11/1482 709/220 |
| 6,973,549 | B1 | * | 12/2005 | Testardi | G06F 9/526 707/E17.005 |
| 6,986,005 | B2 | * | 1/2006  | Vo       | G06F 9/526 711/141 |
| 7,149,853 | B2 | * | 12/2006 | Krueger  | G06F 9/526 711/150 |
| 8,495,131 | B2 | * | 7/2013  | Ahuja    | G06F 9/52 709/203 |

(Continued)

*Primary Examiner* — Umar Cheema
*Assistant Examiner* — Tesfu Mekonen
(74) *Attorney, Agent, or Firm* — Polsinelli LLP

(57) ABSTRACT

The present invention relates to a temporal base method of mutual exclusion control of a shared resource. The invention will usually be implemented by a plurality of host computers sharing a shared resource where each host computer will read a reservation memory that is associated with the shared resource. Typically a first host computer will perform and initial read of the reservation memory and when the reservation memory indicates that the shared resource is available, the first host computer will write to the reservation memory. After a time delay, the host computer will read the reservation memory again to determine whether it has won access to the resource. The first host computer may determine that it has won access to the shared resource by checking that data in the reservation memory includes an identifier corresponding to the first host computer.

20 Claims, 4 Drawing Sheets

(56) References Cited

U.S. PATENT DOCUMENTS

| | | | |
|---|---|---|---|
| 8,909,788 B2* | 12/2014 | Heidenreich | G06F 9/526 |
| | | | 709/225 |
| 9,071,622 B2* | 6/2015 | Grunwald | H04L 67/1087 |
| 9,389,924 B2* | 7/2016 | Shanmuganathan | G06F 9/5027 |
| 2007/0043916 A1* | 2/2007 | Aguilar, Jr. | G06F 12/0842 |
| | | | 711/150 |

* cited by examiner

TEMPORAL BASED COLLABORATIVE MUTUAL EXCLUSION CONTROL OF A SHARED RESOURCE

FIELD OF THE INVENTION

The present invention generally relates to the field of mutual exclusion control of a shared resource.

BACKGROUND OF THE INVENTION

Conventionally there are two basic methods for controlling write accesses to a shared resource such that two concurrent processes run by different computers do not corrupt data stored in the shared resource. A first of these two methods is a token-passing ring method, and the second is a client-server model of enforced resource sharing.

In the token-passing ring method, access to a shared resource is gained by a computer by putting that computer's signature on a token, and passing that token to the next host in the ring. Passing the token with the signature tells the next host that "I want to reserve this resource." The token is typically passed to a plurality of host computers. Each host that receives the token must sign off on the token before the computer that originated the token can access the resource. In this method, each host must allow the originating computer to have access to the resource before the originating computer will access the resource.

In the client-server model, a single resource dispenser tracks which host computer may have access to the resource at a given time. Typically, each host computer sharing the resource must send a request to the resource dispenser and receive an acknowledgement that they may access the resource before they may access the resource.

Both the token-ring and the client-server model require a general purpose interface and use a general protocol for passing tokens or requests, and the entire network must be configured by a system administrator before a shared resource may be shared.

There is a need to improve methods for a plurality of host computers that share a shared resource in a way that minimizes administration costs.

SUMMARY OF THE PRESENTLY CLAIMED INVENTION

The present invention relates to a plurality of computers sharing a resource using a cooperative reservation protocol. An exemplary embodiment of a method of the invention is where a reservation memory receives a first write from a first computer. Data written to the reservation memory includes a first write that includes an identifier that uniquely identifies the first computer. This is followed by the reservation memory receiving a second write from a second computer. The data written to the reservation memory includes an identifier that is unique to the second computer. After a delay from the time when the first computer wrote to the reservation memory, the first computer reads the reservation memory. Since the reservation memory now includes an identifier that identifies another computer, the first computer determines that it has not successfully reserved the shared resource. The first computer then stops attempting to reserve the resource for a time. The second computer, again after a delay from when it wrote to the reservation memory, reads the reservation memory. The second computer then determines that it has successfully reserved the shared resource, because the identifier currently in the reservation memory uniquely identifies the second computer.

The method of the invention may also include the first and the second computer reading the reservation memory before they write to the reservation memory to determine whether the shared resource is currently reserved by another computer. In this instance, computers contending to reserve the shared resource will only write to the reservation memory after they have determined that the reservation memory does not contain an identifier that identifies another computer.

The present invention may be implemented in a non-transitory computer readable medium operating on a processor. The present invention may also be built as a system where a plurality of computers perform a method of reading and writing to a reservation memory according to a protocol consistent with the invention.

DETAILED DESCRIPTION

The present invention relates to a temporal-based method of mutual exclusion (mutex) control of a shared resource. The invention will usually be implemented by a plurality of host computers sharing a shared resource where each host computer will read a reservation memory that is associated with the shared resource. Typically a first host computer will perform an initial read of the reservation memory and when the reservation memory indicates that the shared resource is available, the first host computer will write to the reservation memory. After a time delay, the host computer will read the reservation memory again to determine whether it has won access to the resource. The first host computer may determine that it has won access to the shared resource by checking that data in the reservation memory includes an identifier corresponding to the first host computer.

If data read by the first host computer includes an identifier corresponding to another host computer, then the first host computer will determine that it has lost the bid to have access to the shared resource. Typically, after losing the bid to gain access to the shared resource, the first host computer will attempt to reserve the shared resource again by repeating the sequence at a later time.

Figure 1A:
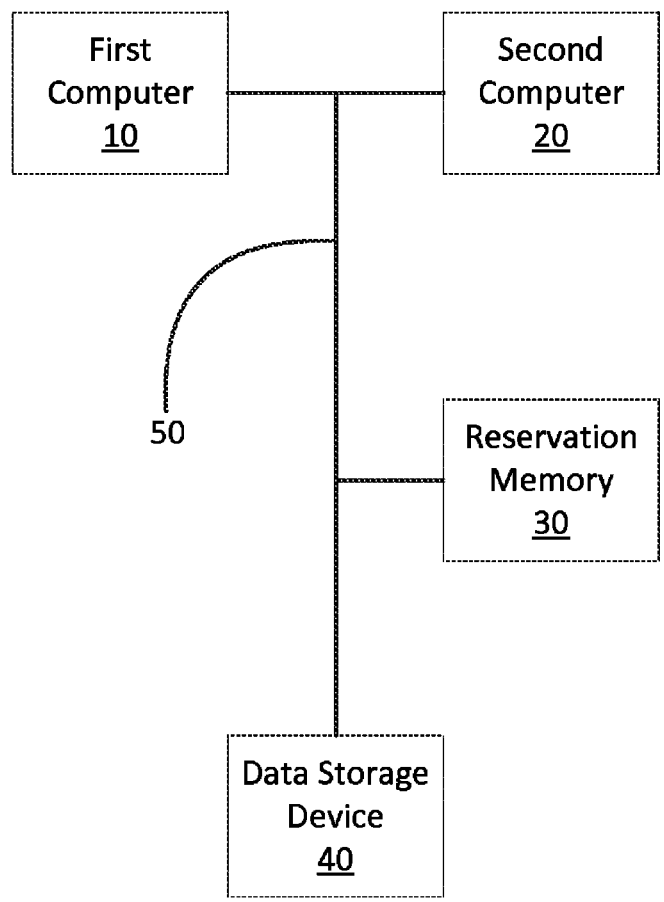
FIG. 1A is a block diagram of a system consistent with an embodiment of the invention.

FIG. 1A is a block diagram of a system consistent with an embodiment of the invention. The figure includes a first computer 10, a second computer 20, a reservation memory 30, a data storage device 40, and a computer network 50. The computer network 50 enables the first computer 10 and the second computer 20 to communicate with the reservation memory 30, and with the data storage device 40. Computer network 50 may be any type of data communication network known in the art including, yet not limited to an Ethernet network, a fiber channel network, or a wireless network. Data storage device 40 may be any type of data storage device known in the art including, yet not limited to a storage area network, a disk drive, a flash drive, and an enclosure containing a plurality of disk drives.

When performing functions consistent with the present invention the first computer 10 and the second computer 20 use the reservation memory according to a protocol where they cooperatively share access to data storage device 40. Data storage device 40 is an example of a shared resource shared by the first computer 10 and the second computer 20.

The protocol that the first computer 10 and the second computer 20 use when reserving access to the data storage device prevents one of the computers from writing to data storage device 40 when it has been reserved by another computer. To accomplish this the computers will first read the reservation memory 30 before they write to the reservation memory. For example, the first computer reads the reservation memory 30, when the reservation memory does not contain an identifier belonging to another computer, the first computer 10 determines that data storage device 40 (the shared resource) is not in a shared state. The first computer 10 will then write data to the reservation memory 30, where the data written includes an identifier unique to the first computer 10. The first computer 10 then waits for a period of time longer than a maximum expected latency from data storage device 40.

After the waiting period, the first computer 10 will read the reservation memory 30 again. If the data read from the reservation memory 30 contains the reservation number of the first computer 10, the first computer determines that it has successfully reserved access to data storage device 40. If, however, the data read from the reservation memory 30 contains the reservation number of the second computer 20, the first computer 10 will determine that the second computer 20 has reserved access to data storage device 40.

When the first computer 10 has successfully reserved access to the data storage device 40, it may access the resource. After performing accesses to the data storage device 40, the first computer will clear the reservation by writing non-reservation data to the reservation memory 30.

When the first computer 10 does not successfully reserved access to the data storage device 40, it will may attempt to reserve access to data storage device 40 at a later time. Even though the reservation memory 30 is depicted as being a separate element in FIG. 1A, it may be included within data storage device 40. In certain instances, the reservation memory is in a reserved sector on a disk drive.

In other instances, the reservation memory is a network device. In such an instance, the reservation memory may include a plurality of different sets of memory locations for storing reservation data corresponding to a plurality of shared resources.

Figure 1B:
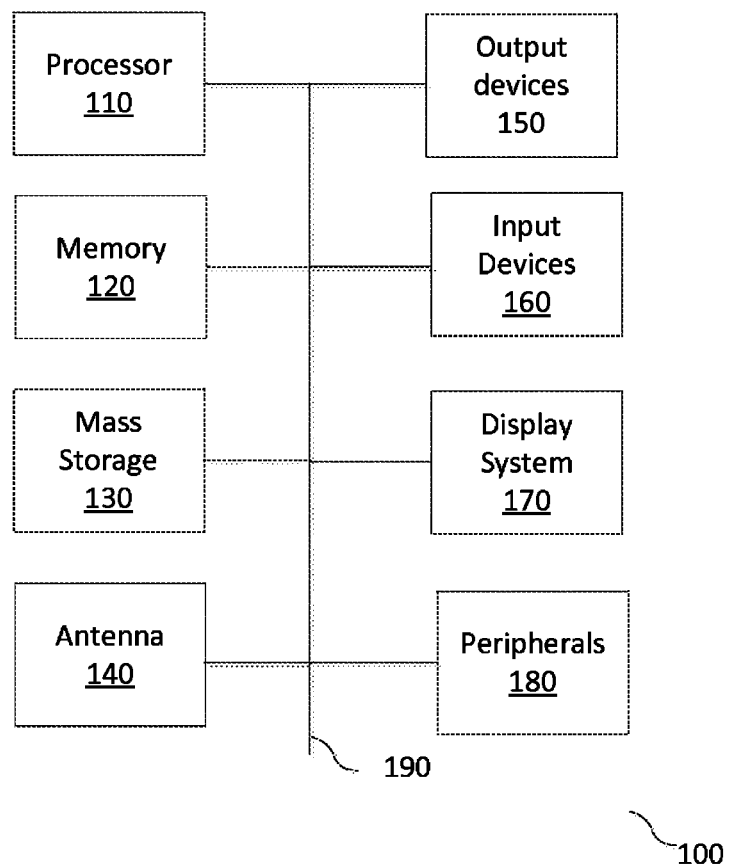
FIG. 1B is a block diagram of a device for implementing the present technology.

FIG. 1B is a block diagram of a device for implementing the present technology. FIG. 1B illustrates an exemplary computing system 100 that may be used to implement a computing device for use with the present technology. System 100 of FIG. 1B may be implemented in the contexts of the likes of clients, servers, storage area networks, or a data base. For example, processor 110, memory 120, mass storage 130, antenna 140, output devices 150, input devices 160, display system 170, and peripherals may be used in a client, a server, a storage area network, or in a data base. The computing system 100 of FIG. 1B includes one or more processors 110 and memory 120. Main memory 120 may store, in part, instructions and data for execution by processor 110. Main memory can store the executable code when in operation. The system 100 of FIG. 1B further includes a storage 120, which may include mass storage and portable storage 130, antenna 140, output devices 150, user input devices 160, a display system 170, and peripheral devices 180.

The components shown in FIG. 1B are depicted as being connected via a single bus 190. However, the components may be connected through one or more data transport means. For example, processor unit 110 and main memory 120 may be connected via a local microprocessor bus, and the storage 130, peripheral device(s) 180 and display system 170 may be connected via one or more input/output (I/O) buses.

Storage device 130, which may include mass storage implemented with a magnetic disk drive or an optical disk drive, may be a non-volatile storage device for storing data and instructions for use by processor unit 110. Storage device 130 can store the system software for implementing embodiments of the present invention for purposes of loading that software into main memory 110.

Mass storage device of storage 130 operates in conjunction with a portable non-volatile storage medium, such as a floppy disk, compact disk or Digital video disc, to input and output data and code to and from the computer system 100 of FIG. 1B. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 execute programs stored in memory 120 to control antenna 140 transmit a wireless signal to a cellular network and receive a wireless signal from a cellular network.

The system 100 as shown in FIG. 1B includes output devices 150 and input device 160. Examples of suitable output devices include speakers, printers, network interfaces, and monitors. Input devices 160 may include a touch screen, microphone, accelerometers, a camera, and other device. Input devices 160 may include an alpha-numeric keypad, such as a keyboard, for inputting alpha-numeric and other information, or a pointing device, such as a mouse, a trackball, stylus, or cursor direction keys.

Display system 170 may include a liquid crystal display (LCD), LED display, or other suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1B are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 100 of FIG. 1B can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 2:
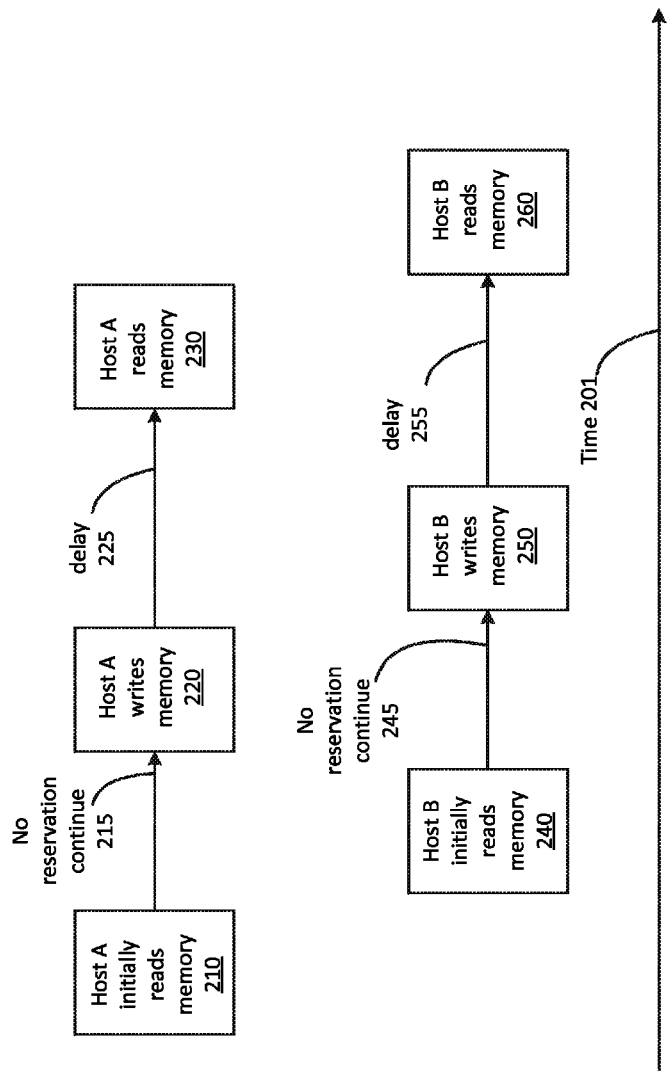
FIG. 2 is a diagram showing the timing of two host computers attempting to reserve a shared resource.

FIG. 2 is a diagram showing the timing of two host computers that are attempting to reserve access to a shared resource. Shared resources include, yet are not limited to a storage array network (SAN), a data server, or a database. The memory referred to in FIG. 2 is a reservation memory used by a plurality of computers that is used to reserve access to a shared resource for a time. The location of the reservation memory will be known by all computers that wish to cooperatively share access to the shared resource. The reservation memory may be located within the shared resource, or may be physically located in another location. For example, the reservation memory may be located within a disk drive, and that disk drive may be the shared resource. In one instance, the reservation memory is located in a reserve sector of the disk drive. In other instances, the reservation memory may be located within a redundant array of independent disks (RAID). In yet other instances the reservation memory may be located in a network device. The only limitation associated with the location of the reservation memory is that it must be accessible by any of the computers performing collaborative sharing of a shared resource.

When the data in the reservation memory includes the identifier of a computer, the shared resource is in a reserved state. When the data in the reservation memory does not include the identifier of a computer, the shared resource is not in a reserved state.

The arrow labeled time 201 that proceeds from left to right in FIG. 2 represents time progressing forward. Host A initially reads 210 a reservation memory after which host B initially reads 240 the reservation memory. At this point, host A determines that the shared resource is not reserved: i.e., the shared resource has no reservation 215 and is free to continue. So Host A then writes to the reservation memory 220. Similarly, host B determines that the shared resource has no reservation 245, and host B is free to continue to write to the reservation memory 250. When host B writes to the reservation memory 250, it overwrites the data written by host A. Each host computer, host A and host B, writes data to the reservation memory. Data included in each of these writes overwrites data in the reservation memory that was written earlier, and data from each write includes an identifier of the host computer that performed the write. These host computer identifiers uniquely identify the computer that wrote to the reservation memory location. In certain instances these identifiers are a host name, in other instances these identifiers are an internet protocol address.

After writing to the reservation memory, host A delays for a period of time, this is shown in FIG. 2 as delay 225. Similarly, after writing to the reservation memory host B delays for a time, this is shown in FIG. 2 as 255. These delay times must be longer than an expected maximum latency for performing an access to the shared resource. FIG. 2 shows host A reading 230 the reservation memory before host B reads 260 the reservation memory.

After host B 260 reads the reservation memory, host B will determine that the reservation memory contains the identifier of host B, indicating to host B that it has reserved the shared resource. Similarly, at 230 host A reads the reservation memory and determines that host B has reserved the shared resource, as the reservation memory contains host B's identifier. At this time, host A will stop attempting to reserve (or lock) the shared resource for a time.

Data written to the reservation memory may also include a reservation number, a process identifier, and a reservation time. In certain instances, the reservation number is a timestamp. The reservation time will typically be an indicator of how long a computer reserves or wishes to reserve the shared resource. Since each individual host computer will typically keep a measure of absolute time, each host computer will have an indication of absolute time. Frequently, however, the absolute time kept by each host computer will not be perfectly synchronized. This is because each host computer may have a different fundamental clock frequency, making each computer's timestamp or reservation time only an indication of absolute time. In the instances where the reservation number included is a is a timestamp, the timestamp is an indication of when the reservation memory was written to by a computer.

When host A reads 230 reservation memory, host A will make a copy of the data read from the reservation memory, and will begin counting relative time from this moment as it continues to attempt to reserve the shared resource. On each subsequent attempt by host A to read 230 the reservation memory, the data from the read will be compared with the copy made during the earlier read. If the comparison indicates any change in the data, then a new copy of the data is made to replace the old copy, and the relative time counter is restarted. If the comparison indicates that no change has occurred, and the relative time counter exceeds the reservation time contained in the reservation memory, host A will consider the reservation by B to have expired, and will behave as though the device is not reserved. This protects against host B acquiring exclusive access to the resource, but then failing to release the resource for any reason, which may include program errors, operating system faults, hardware failures, or power failures.

After host A reads 230 the reservation memory, it may determine the amount of time host B has reserved the shared resource for. Host A determines this from the reservation time included in the data read by host A in step 230. Host A may then perform other tasks for a period of time greater than the reservation time. Host A may then attempt to gain access to the shared resource at after the reservation time has expired.

Figure 3:
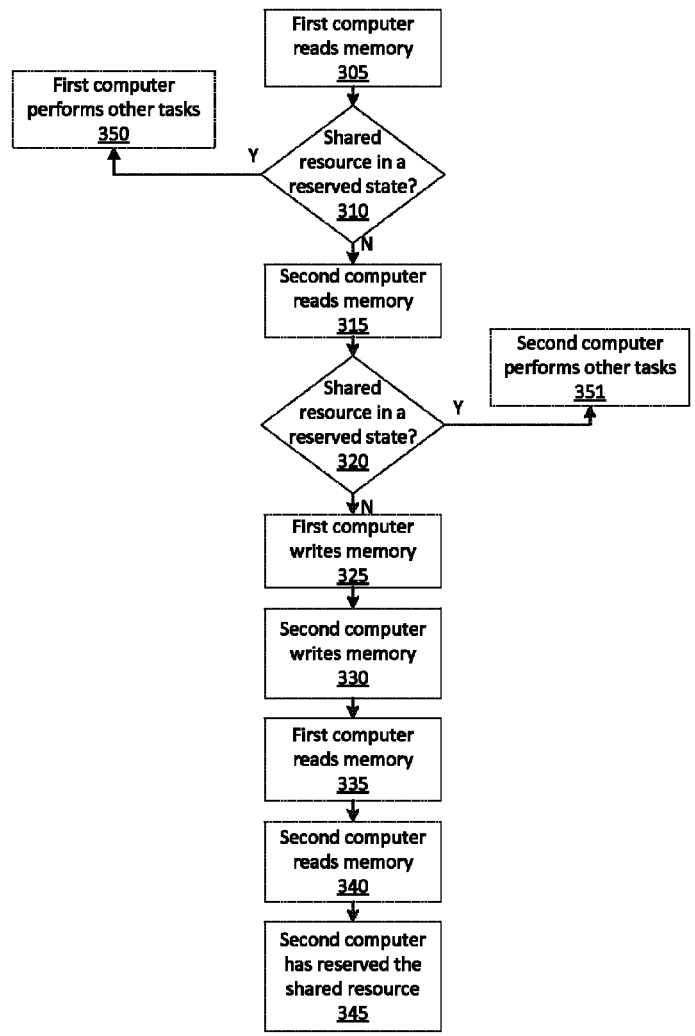
FIG. 3 is a simplified flow chart consistent with an embodiment of the invention.

FIG. 3 is a simplified flow chart consistent with an embodiment of the invention. As discussed with respect to FIG. 2, the reservation memory referred to in FIG. 3 is a memory used by a plurality of computers that is used to reserve access to a shared resource for a time. The location of the reservation memory will be known by all computers that wish to cooperatively share access the shared resource. Here again, when the data in the reservation memory includes the identifier of a computer, the shared resource is in a reserved state. Similarly, when the data in the reservation memory does not include the identifier of a computer, the shared resource is not in a reserved state. The reservation memory included in the present invention may be located within the shared resource, or may be physically located in another location. For example, the reservation memory may be located within a disk drive, and that disk drive may be the shared resource. In one instance, the reservation memory is located in a reserve sector of the disk drive. In other instances, the reservation memory may be located within a redundant array of independent disks (RAID). In yet other instances the reservation memory may be located in a network device.

FIG. 3 begins with a first computer reading reservation memory at step 305, A first computer determines whether the shared resource is in a reserved state at step 310. As mentioned above, when the reservation memory does not contain an identifier of a computer, this indicates the shared resource is not in a reserved state.

When the shared resource is in a reserved state, the flow diagram proceeds to step 350 where the first computers performs other tasks. The first computer may attempt to reserve the shared resource at a later time, typically the first computer will wait for at least the amount of time indicated in the reservation memory that was written by another host computer.

When the shared resource is not in a reserved state, the flow chart then proceeds to step 315. At step 315, a second computer reads the reservation memory before the method continues to step 320 where the second computer determines whether the shared resource is in a reserved state. When the second computer determines that the shared resource is not in a reserved state at step 320, the flow chart proceeds to step 325. When the second computer determines that the resource is in the reserved state, the flow chart proceeds to step 351 where the second computer performs other tasks. The second computer may attempt to reserve the shared resource at a later time. Typically, the second computer will wait for at least the amount of time indicated in the reservation memory that was written by another host computer.

At step 325, the first computer writes to the reservation memory. The flow chart then proceeds to step 330 where the second computer writes to the reservation memory. In step 335, the first computer reads the reservation memory, and in step 340 the second computer reads the reservation memory. Since at this time the reservation memory contains an identifier of the second computer, the second computer has reserved the shared resource 345.

The reservation memory included in the present invention may be located within the shared resource, or may be physically located in another location. For example, the reservation memory may be located within a disk drive, and that disk drive may be the shared resource. In one instance, the reservation memory is located in a reserve sector of the disk drive. In other instances, the reservation memory may be located within a redundant array of independent disks (RAID). In yet other instances the reservation memory may be located in a network device. The only limitation associated with the location of the reservation memory is that it must be accessible by any of the computers performing collaborative sharing of a shared resource. The present invention may also include any number of host computers performing collaborative sharing of the shared resource.

In certain instances, the reservation memory may be used to control access to a plurality of shared resources. In these instances, the reservation memory will typically include a plurality of different sets of memory locations for storing the reservation data. For example, a location where the reservation memory is stored could be a sector on a network disk drive.

The reservation memory may also be implemented in any form of persistent memory including, yet not limited to FLASH, disk, battery backed up random access memory, racetrack memory, magnetic random access memory, or phase change memory.

In an instance where a particular host computer goes off line for an extended period of time after performing a read after the write, that host may believe that it still has access to the shared resource when it may not. To preclude this for corrupting memory on the shared resource, a process controlling the shared resource or the shared resource itself may also be informed as to which host computer currently has control of the shared resource, and the access by the host computer that went off line for an extended period of time may be blocked.

In other instances, the computer that went off line for an extended period of time, may determine that it has a stale reservation of the shared resource by comparing a timestamp corresponding to when a reservation was made to the current time. For example, if the current time is 3:45 pm, and the shared resource was reserved by a computer at 1:00 pm with a reservation time of 100 milliseconds, the computer could determine that its reservation is stale. In such an instance, the computer should read the reservation memory to validate the current state of the shared resource.

The figures included with this disclosure are for the purpose of illustrating the invention. The figures show aspects of one or more embodiments of the invention and are examples, the figures are not meant to limit the scope of the invention. It should be understood that the present invention is not limited to the precise arrangements and instrumentalities shown in the figures.

The detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for synchronizing a plurality of computers attempting to access a shared resource, the method comprising:
   receiving a first write command over a computer network interface from a first computer of the plurality of computers by a reservation memory, wherein the reservation memory is reserved for receiving reservation information corresponding to reserving access to the shared resource by the plurality of computers, the shared resource including one or more data storage devices storing data accessible over a computer network, and the first write command writing an identifier associated with the first computer to the reservation memory in an attempt to reserve access to the shared resource;
   receiving a second write command over the computer network interface from the second computer of the plurality of computers by the reservation memory, the second write command writing an identifier associated with the second computer to the reservation memory, wherein the writing of the identifier of the second computer overwrites the identifier of the first computer in the reservation memory;
   receiving a read command over the computer network interface by the reservation memory from the second computer, wherein the second computer identifies that it has reserved the shared resource based on the reservation memory including the identifier associated with the second computer, access to the shared resource is limited to the second computer as long as the reservation memory indicates that the second computer has reserved the shared resource, and access commands addressing the shared resource from a computer other than the second computer are blocked based on the reservation memory including the identifier associated with the second computer.

2. The method of claim 1, further comprising:
receiving a first preliminary read command by the reservation memory from the first computer before the first write command and second write command are received, wherein the first computer identifies that the shared resource is not currently in a reserved state when data in the reservation memory does not include an identifier associated with any computer of the plurality of computers, and
receiving a second preliminary read command by the reservation memory from the second computer before the first write command and the second write command are received, wherein the second computer identifies that the shared resource is not currently in a reserved state based on the data stored in the reservation memory not corresponding to a computer identifier of the plurality of computers; and
receiving a read command by the reservation memory from the first computer after the receiving the second write command, wherein the first computer identifies that the second computer has reserved the shared resource based on the reservation memory including the identifier associated with the second computer.

3. The method of claim 1, wherein:
the data written to the reservation memory by the first computer includes a first reservation number,
the data written to the reservation memory by the second computer includes a second reservation number, and
the computer other than the second computer previously held a reservation to the shared resource before the other computer went offline and lost the previously held reservation to the shared resource.

4. The method of claim 3, wherein:
the data written to the reservation memory by the first computer includes a first reservation time that the first computer wishes to reserve the shared resource for; and
the data written to the reservation memory by the second computer includes a second reservation time that the second computer wishes to reserve the shared resource for.

5. The method of claim 4, wherein:
the first computer identifies a reservation time that the second computer has reserved the shared resource for; and
the first computer waits for at least a time corresponding to the second reservation time before attempting to reserve the shared resource again.

6. The method of claim 1, further comprising:
receiving a write command to the reservation memory from the second computer, wherein the second computer writes non-reservation data to the reservation memory after performing one or more actions on the shared resource.

7. The method of claim 1, wherein:
the time between the first write to the reservation memory and the time of the first read of the reservation memory corresponds to a first delay controlled by the first computer; and
the time between the second write to the reservation memory and the time of the second read of the reservation memory corresponds to a second delay controlled by the second computer.

8. The method of claim 7, wherein the first delay and the second delay correspond to times that are larger than a maximum expected latency from the shared resource.

9. The method of claim 3, wherein:
the first reservation number written by the first computer includes a first timestamp corresponding to a time when the first computer wrote to the reservation memory, and
the second reservation number written by the second computer includes a second timestamp corresponding to a time when the second computer wrote to the reservation memory.

10. A non-transitory computer readable storage medium having embodied thereon a program executable by a process to perform a method for synchronizing a plurality of computers attempting to access a shared resource, the method comprising:
receiving a first write command over a computer network interface from a first computer of the plurality of computers, wherein the reservation memory is reserved for receiving reservation information corresponding to reserving access to the shared resource by the plurality of computers, the shared resource including one or more data storage devices storing data accessible over a computer network, and the first write command writing an identifier associated with the first computer to the reservation memory in an attempt to reserve access to the shared resource; and
receiving a second write command over the computer network interface from the second computer of the plurality of computers by the reservation memory, the second write command writing an identifier associated with the second computer to the reservation memory, wherein the writing of the identifier of the second computer overwrites the identifier of the first computer in the reservation memory;
receiving a read command over the computer network interface from the second computer, wherein the second computer identifies that it has reserved the shared resource based on the reservation memory including the identifier associated with the second computer, access to the shared resource is limited to the second computer as long as the reservation memory indicates that the second computer has reserved the shared resource, and access commands addressing the shared resource from a computer other than the second computer are blocked based on the reservation memory including the identifier associated with the second computer.

11. The non-transitory computer readable storage medium of claim 10, the program being further executable to:
receive a first preliminary read command by the reservation memory from the first computer before the first write command and second write command are received, wherein the first computer identifies that the shared resource is not currently in a reserved state when data in the reservation memory does not include a computer identifier; and
receive a second preliminary read command by the reservation memory from the second computer before the first write command and the second write command are received, the second computer determining the shared resource is not currently in a reserved state when data in the reservation memory does not include a computer identifier; and
receive a read command by the reservation memory from the first computer after the receiving the second write command, wherein the first computer identifies that the second computer has reserved the shared resource based on the reservation memory including the identifier associated with the second computer.

12. The non-transitory computer readable storage medium of claim 10, wherein:
the data written to the reservation memory by the first computer includes a first reservation number,
the data written to the reservation memory by the second computer includes a second reservation number, and
the computer other than the second computer previously held a reservation to the shared resource before the other computer went offline and lost the previously held reservation to the shared resource.

13. The non-transitory computer readable storage medium of claim 12, wherein:
the data written to the reservation memory by the first computer includes a first reservation time that the first computer wishes to reserve the shared resource for; and
the data written to the reservation memory by the second computer includes a second reservation time that the second computer wishes to reserve the shared resource for.

14. The non-transitory computer readable storage medium of claim 13, wherein:
the first computer identifies a reservation time that the second computer has reserved the shared resource for; and
the first computer waits for at least a time corresponding to the second reservation time before attempting to reserve the shared resource again.

15. The non-transitory computer readable storage medium of claim 10, further comprising:
receiving a write command to the reservation memory from the second computer, wherein the second computer writes non-reservation data to the reservation memory after performing one or more actions on the shared resource.

16. The non-transitory computer readable storage medium of claim 10, wherein:
the time between the first write to the reservation memory and the time of the first read of the reservation memory corresponds to a first delay controlled by the first computer; and
the time between the second write to the reservation memory and the time of the second read of the reservation memory corresponds to a second delay controlled by the second computer.

17. The non-transitory computer readable storage medium of claim 16, wherein the first delay and the second delay correspond to times that are larger than a maximum expected latency from the shared resource.

18. An Apparatus for synchronizing a plurality of computers attempting to access a shared resource, the system comprising:
a computer network interface;
a reservation memory coupled to a computer network, wherein the reservation memory:
receives a first write command over the computer network interface from a first computer of the plurality of computers, wherein the reservation memory is reserved for receiving reservation information corresponding to reserving access to the shared resource by the plurality of computers, the shared resource including one or more data storage devices storing data accessible over a computer network, and the first write command writing an identifier associated with the first computer to the reservation memory in an attempt to reserve access to the shared resource,
receives a second write command over the computer network interface from the second computer of the plurality of computers, the second write command writing an identifier associated with the second computer to the reservation memory, wherein the writing of the identifier of the second computer overwrites the identifier of the first computer in the reservation memory, and
receives a read command over the computer network interface from the second computer, wherein the second computer identifies that it has reserved the shared resource based on the reservation memory including the identifier associated with the second computer, access to the shared resource is limited to the second computer as long as the reservation memory indicates that the second computer has reserved the shared resource, and access commands addressing the shared resource from a computer other than the second computer are blocked based on the reservation memory including the identifier associated with the second computer.

19. The apparatus of claim 18, wherein the reservation memory:
receives a first preliminary read command from the first computer before the first write command and second write command are received, wherein the first computer identifies that the shared resource is not currently in a reserved state when data in the reservation memory does not include an identifier associated with any computer of the plurality of computers,
receives a second preliminary read command from the second computer before the first write command and the second write command are received, wherein the second computer identifies that the shared resource is not currently in a reserved state based on the data stored in the reservation memory not corresponding to a computer identifier of the plurality of computers, and
receives a read command from the first computer after receiving the second write command, wherein the first computer identifies that the second computer has reserved the shared resource based on the reservation memory including the identifier associated with the second computer.

20. The apparatus of claim 18, wherein:
the data written to the reservation memory by the first computer includes a first reservation number,
the data written to the reservation memory by the second computer includes a second reservation number, and
the computer other than the second computer previously held a reservation to the shared resource before the other computer went offline and lost the previously held reservation to the shared resource.

* * * * *